March 10, 1959 G. E. HART ET AL Re. 24,616
CIRCULAR MULTI-FEED HOSIERY KNITTING MACHINE AND METHOD OF KNITTING
Original Filed May 31, 1955
5 Sheets-Sheet 1
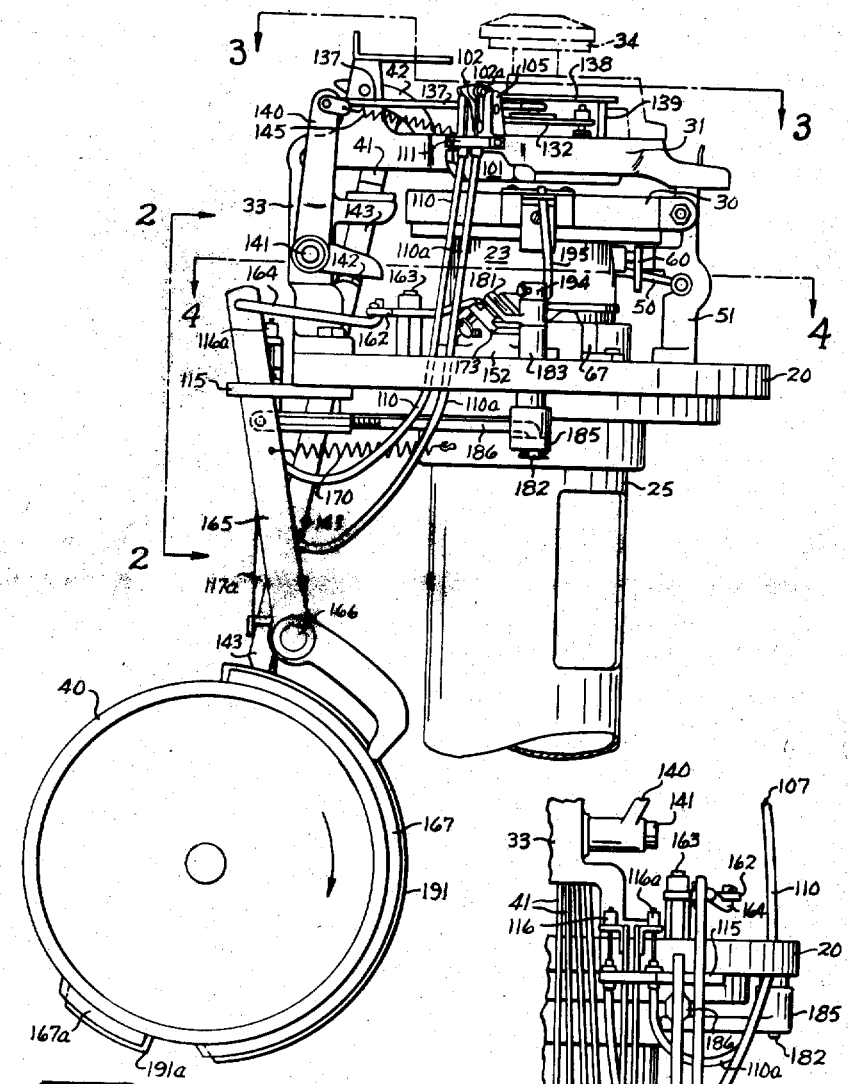
INVENTORS:
GENE E. HART and
HOWARD F. METCALF GENE E. HART and
HOWARD F. METCALF,
INVENTORS.

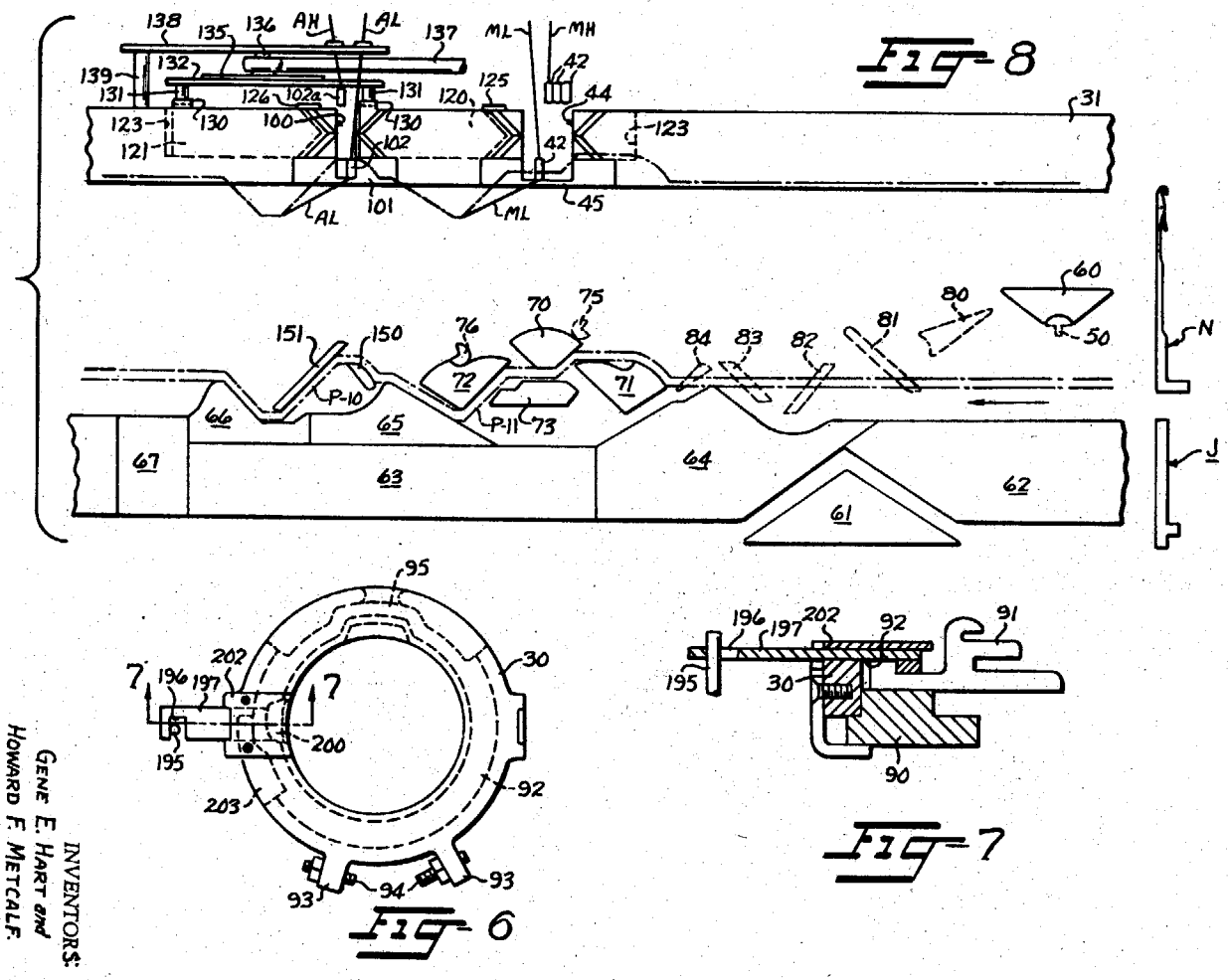
INVENTORS:
GENE E. HART and
HOWARD F. METCALF.

INVENTORS:
GENE E. HART and
HOWARD F. METCALF.

Fig-12
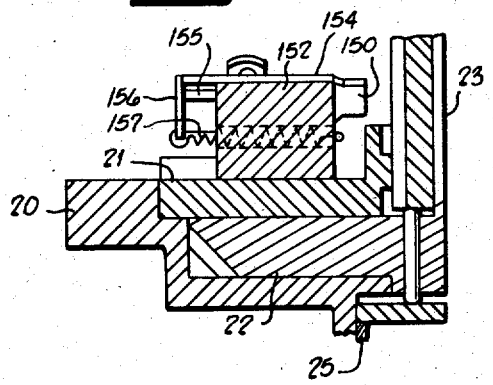
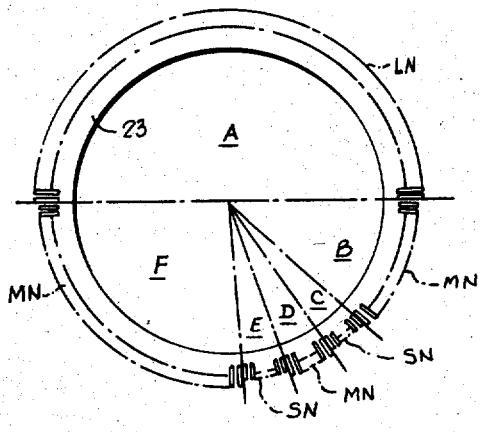
Fig-13
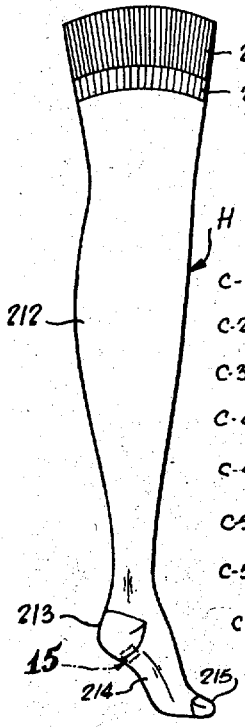
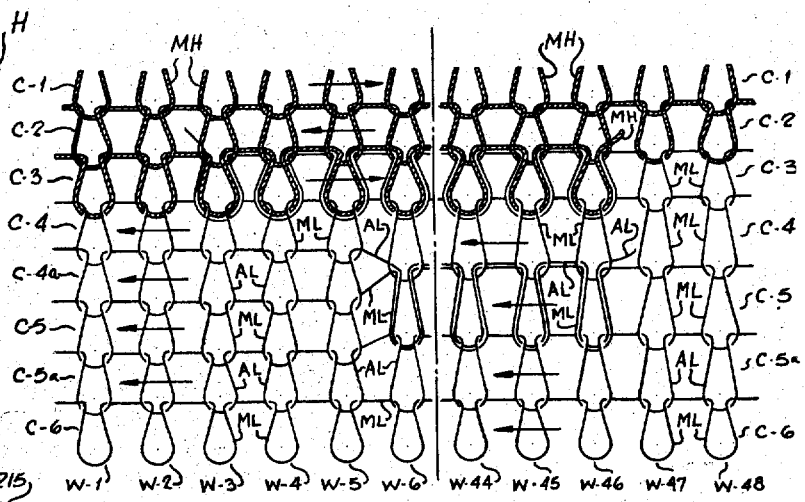
Fig-15
Fig-14
INVENTORS
GENE E. HART and
HOWARD F. METCALF.

United States Patent Office

Re. 24,616
Reissued Mar. 10, 1959

24,616

CIRCULAR MULTI-FEED HOSIERY KNITTING MACHINE AND METHOD OF KNITTING

Gene E. Hart and Howard F. Metcalf, Charlotte, N. C., assignors to Carolina Knitting Machine Corporation, Charlotte, N. C., a corporation of North Carolina Original No. 2,785,553, dated March 19, 1957, Serial No. 511,936, May 31, 1955. Application for reissue January 23, 1958, Serial No. 710,830

6 Claims. (Cl. 66—42)

Matter enclosed in heavy brackets [ ] appears in the original patent but forms no part of this reissue specification; matter printed in italics indicates the additions made by reissue.

This invention relates to circular knitting machines and more especially to a circular multi-feed knitting machine adapted to knit from a plurality of feeding stations during rotary knitting.

Heretofore there have been attempts to make multi-feed knitting machines using two or more feeds to thus increase the speed of knitting such articles as ladies' fine-gauge hosiery, but heretofore the second or auxiliary yarn in the multi-feed set-up has been supplied by an auxiliary finger placed between the latch ring and needles which interferes with the normal free operation of the latches on the latch needles in the needle cylinder.

It is therefore a primary object of this invention to provide a multi-feed circular knitting machine which has a main or primary feeding station comprising a throat opening having a throat plate and gap closer for closing the throat during reciprocatory knitting as well as an auxiliary feeding station comprising a throat opening having a throat plate and gap closer for closing the auxiliary throat during reciprocatory knitting, to thus provide a smooth inner race against which the latches of the latch needles may ride during reciprocatory knitting.

It is another object of this invention to provide an auxiliary feeding station with the throat cut in the latch ring in the same manner as the throat at the main feeding station.

A needle raising cam and a needle lowering cam form an auxiliary stitching station spaced below the auxiliary feeding stations apart from the main stitch cams including the top center stitch cam and the right and left-hand stitch cams. The main stitch cams are spaced below the main feeding station. The auxiliary stitching cams including the needle raising cam and the needle lowering cam are movable radially into and out of engagement with the needle cylinder.

It is another object of this invention to provide a means and method of introducing yarn at the auxiliary feeding finger to the needles in the needle cylinder which prevents holes and cat-eyes being formed in the fabric when this auxiliary yarn feeding finger is moved into feeding position. This novel method of starting to knit with the auxiliary yarn feed finger is made possible by the arrangement of needle butts of varying lengths in the needle cylinder.

Some of the objects of the invention having been stated, other objects will appear as the description proceeds when taken in connection with the accompanying drawings, in which—

Figure 1 is a side elevation of the upper portion of a knitting machine of the circular type and showing the invention applied thereto;

Figure 2 is a fragmentary rear elevation of the knitting machine being taken substantially along the line 2—2 in Figure 1;

Figure 6 is a plan view of the sinker cap removed from the knitting machine;

Figure 7 is an enlarged transverse vertical sectional view taken substantially along the line 7—7 in Figure 6;

Figure 8 is a somewhat schematic developed view of the cams surrounding the needle cylinder and taken as if looking outwardly from the needle cylinder and showing the path of travel of the needles during circular knitting;

Figure 12 is an enlarged vertical sectional view taken through the auxiliary stitch cam block and being taken substantially along the line 12—12 in Figure 5;

Figure 13 is a somewhat schematic sectional plan view of the needle cylinder and showing the arrangement of the needles in the needle cylinder according to the length of the butts thereon;

Figure 14 is a perspective rear view of the ladies' hose as it appears on the wearer's leg;

Figure 15 is an enlarged fragmentary view of that portion of the hose indicated by the dotted rectangle 15 in Figure 14 and showing where the auxiliary yarn feeding finger and the auxiliary stitch cams are moved into operation.

Figure 3:
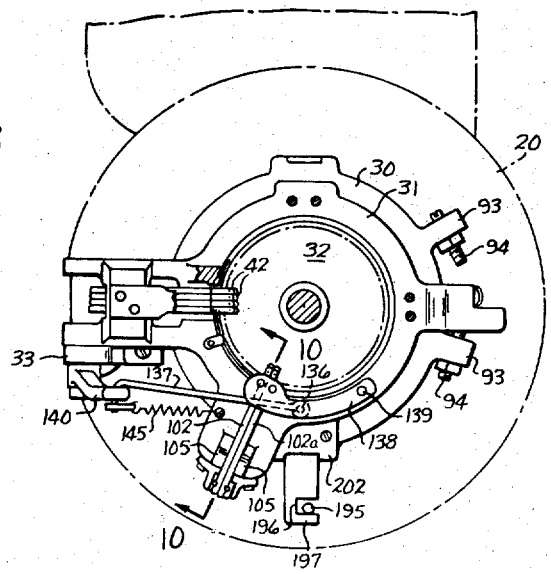
Figure 3 is a sectional plan view taken substantially along the line 3—3 in Figure 1.

Referring more specifically to the drawings, the numeral 20 indicates the bed plate of a conventional circular knitting machine having the usual cam bed plate 21 (Figures 4, 11 and 12) fixedly secured thereto as well as the conventional bevel gear 22 for driving the needle cylinder 23. A sock horn 25 extends upwardly into the bed plate 20 and has conventional means provided therewith to raise and lower the needle cylinder to produce longer or shorter stitches in a conventional manner. The knitting machine is also provided with the usual sinker cap 30, a latch ring 31, the usual dial 32 (Figure 3) and gearing 34 (Figure 1) for driving the dial 32 in making the usual turned welt of the ladies' hose. The latch ring 31 is supported at its rear end on a support post 33.

Figure 9:
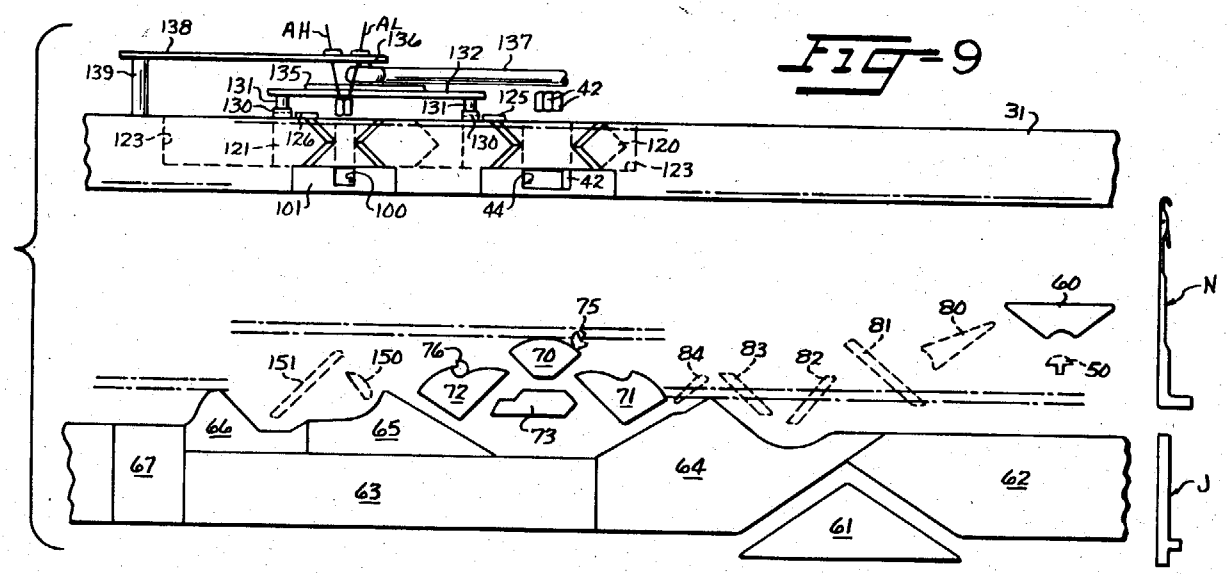
Figure 9 is a view similar to Figure 8 except showing the path of travel of the needles during reciprocatory knitting.

The knitting machine is also provided with a conventional main pattern drum 40 on which the lower ends of a plurality of thrust bars 41 rest and the upper ends of which are adapted to engage a plurality of conventional yarn feeding fingers 42 (Figures 1, 3, 8 and 9) which are pivotally mounted on an upstanding portion on the latch ring 31. A heavy weight or denier main yarn MH (Figure 8 and 9) is fed to one of the yarn feeding fingers 42 for use in knitting the welt, heel and toe of the hose H (Figure 14) and a light weight main yarn ML is fed to another of the yarn feeding fingers 42 for use in knitting the leg and foot of the hose H. The latch ring 31 is also provided with a main throat 44 having a throat plate 45 (Figures 8 and 9). The knitting machine is also provided with the usual widening pick 50 (Figures 1, 8 and 9) which is pivotally mounted on a bunter post 51, the lower end of which is suitably secured to the bed plate 20. The widening pick 50 is adapted to at times nest in a fixed guide cam 60 suitably secured on the bunter post 51.

A plurality of fixed needle cams encircle the needle cylinder, including a jack raising cam 61 (Figures 8 and 9), a first fixed cam segment 62, a second cam segment 63, respective right-hand and left-hand hardened cams 64 and 65, an auxiliary hardened cam 66 and a jack gate 67. The usual stitch cams are provided, including a top center stitch cam 70, respective right and left stitch cams 71 and 72 as well as a bottom center cam 73. A pair of conventional narrowing picks 75 and 76 are connected by a link 77 (Figure 4) and work in conjunction with the respective right-hand and left-hand stitch cams 71 and 72.

Among the conventional movable cams around the needle cylinder are included a switch needle lowering cam 80, a switch needle raising cam 81, a needle transfer cam 82 and a pair of needle raising and lowering cams 83 and 84 which are used in the make-up to start a new hose. The pair of switch cams 80 and 81 are used in switching part of the needles in the needle cylinder into and out of action in making the toe and heel pockets during reciprocatory knitting in a conventional manner. The transfer cam 82 is used when transferring from knitting on the dial needles, not shown, to knit stitches with the cylinder needles N. The cams shown in Figures 8 and 9 are adapted to operate conventional needle jacks indicated at J.

The sinker cap partially encloses a sinker bed 90 (Figure 7) which is fixedly secured to the upper end of the needle cylinder 23 and has radial grooves therein for reception of conventional sinkers 91, the tail portions of which ride in a concentric groove 92 (Figures 6 and 7) in the sinker cap 30. The sinker cap 30 is provided with lugs 93 which have threadably embedded bunters 94 adapted to alternately engage opposite sides of the bunter post 51 as the sinker cap 30 is reciprocated during reciprocatory knitting. The concentric groove 92 in the sinker cap 30 is provided with an outwardly extending portion 95 which is in vertical alinement with the top center cam 70 and is provided to move the sinkers outwardly radially of the needle cylinder when the yarn is being fed at the main throat 44 so that a main yarn will be fed beneath the nibs of the sinkers 91 in a conventional manner.

All of the parts heretofore, described are conventional in a Scott and Williams model K circular knitting machine, with the exception of the auxiliary hardened cam 66, and it is with these parts that the present invention is adapted to be associated.

The novel features of this invention include an auxiliary throat 100 cut in the latch ring 31 and the lower end of the throat 100 is closed by a throat plate 101 which is adapted to selectively support the inner lower ends of one of a pair of yarn feeding fingers 102 and 102a (Figures 3, 8, 9 and 10). Although only two yarn feeding fingers 102 and 102a are shown in the throat 100, it is to be understood that any desired number of yarn feeding fingers could be mounted in the auxiliary throat 100 of the latch ring 31.

Figure 10:
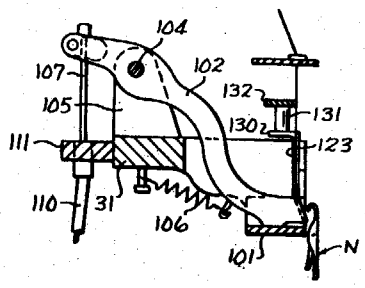
Figure 10 is a vertical sectional view, at an enlarged scale, and being taken substantially along the line 10—10 in Figure 3.

The auxiliary yarn feeding fingers 102 and 102a are oscillatably mounted as at 104 (Figure 10) on upstanding portions 105 which are cast integral with the latch ring 31 adjacent opposite sides of the throat 100 and form a novel part of this invention. The yarn feeding fingers 102 and 102a are resiliently urged into engagement with the throat plate 101 by a pair of springs 106, only one of which is shown, which springs extend from respective yarn feeding fingers 102 and 102a to the latch ring 31. The yarn feed fingers 102 and 102a are moved into and out of engagement with the throat plate 101 by a pair of respective Bowden wires 107 and *107a*, the upper ends of which are secured to the outer or free ends of the yarn feeding fingers 102, 102a. The wires 107, *107a* have sliding movement in casings 110, 110a, the upper ends of which are secured in a bracket 111 fixed on the latch ring 31 (Figure 10).

Figure 4:
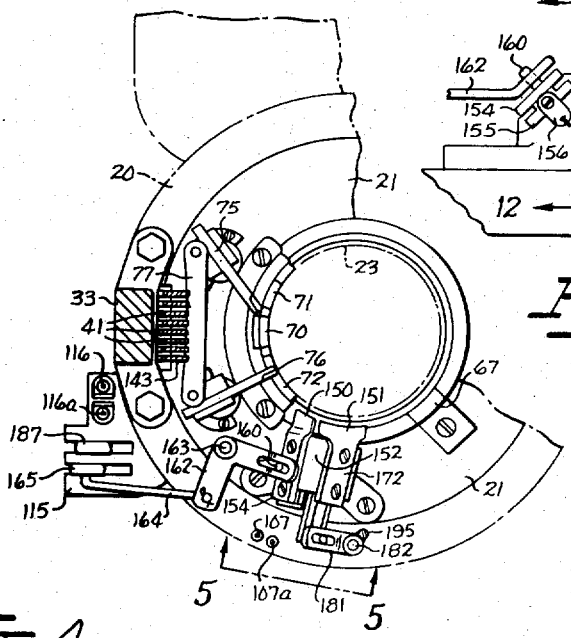
Figure 4 is a fragmentary sectional plan view taken substantially along the line 4—4 in Figure 1.

The casings 110 and 110a pass downwardly (Figure 1) through the bed plate 20 and are bent upwardly and their ends remote from the bracket 111 are fixed in a bracket 115 mounted on the lower edge of the bed plate 20 (Figures 2 and 4). The wires 107, 107a extend from the lower ends of the casings 110, 110a and are connected as at 116, 116a to the upper ends of respective thrust bars 117, 117a. The lower ends of the thrust bars 117, 117a are adapted to, at times, engage the outer periphery of the main pattern drum 40 and at other times to engage suitable segmental cams mounted thereon, not shown, for raising and lowering the respective wires 116, 116a. Vertical movement of the thrust bars 117, 117a will thus move the corresponding auxiliary yarn feeding fingers 102, 102a into and out of feeding position in the throat 100.

Another of the novel features of this invention is the novel means for closing the main throat 44 as well as the auxiliary throat 100 by a pair of gap closing plates 120, 121 which operate together to close the respective throats 44 and 100 simultaneously during reciprocatory knitting (Figures 8 and 9). This feature is important in that it makes possible a further increase in the production of high speed knitting machines which produce such articles as ladies' fine-gauge seamless hose.

Prior attempts to increase production by adding auxiliary feeding fingers for knitting the long leg portion of a ladies' seamless hose two courses at a time have failed because there has never been provided two throats in the latch ring and means for selectively closing these two throats to provide a smooth inner surface in the latch ring for the latches of the inoperative or raised needles to ride against. Without the two gap closing plates 120, 121, the latches of the raised or inoperative needles tend to fly outwardly by centrifugal force during high speed operation and may become bent or broken when they engage the open throats heretofore provided.

The gap closers 120, 121 are slidably mounted in a groove 123 in the latch ring 31 (Figures 8, 9 and 10) and are prevented from upward movement out of the groove 123 by a pair of hold down plates 125 and 126 which are secured on the latch ring and overlie the groove 123. Each of the gap closers 120, 121 is provided with an upwardly and outwardly extending tail portion 130 (Figure 10) in which the lower ends of upstanding pins 131 are embedded, the upper ends of which are fastened to a connecting link 132 which extends between the pins 131. The connecting link 132 has a plate 135 adjustably mounted thereon in which an upstanding pin 136 is fixedly secured.

The pin 136 is engaged by a gap actuating control rod 137 (Figures 3, 8 and 9) which extends away from the latch ring 31 and to the left of the machine in Figures 1 and 3 and is oscillatably mounted on the upper leg of a crank arm 140 pivotally mounted on the latch ring support 33 as at 141. A yarn guide plate 138 is spaced above the latch ring 30 and supported on an upstanding post 139 for guiding auxiliary light and heavy weight yarns AL and AH to the respective auxiliary yarn feeding fingers 102, 102a through suitable yarn guides in the plate 138.

The lower leg of the bell crank 140 is adapted to be engaged by a bracket 142, fixed on a thrust bar 143, the lower end of which is adapted to at times engage the outer periphery of the pattern drum 40 and at other times to engage segmental cams placed thereon, not shown, for raising and lowering the thrust bar 143. When the lower end of the thrust bar 143 is engaged by one of the segmental cams on the main pattern drum 40 the thrust bar 143 will be raised upwardly to thus rotate the bell crank 140 (Figure 1) in a counterclockwise direction to thus move the gap closing plates 120, 121 from left to right in Figure 8 or to the position shown in Figure 9 and close the respective throats 44, 100. A spring 145 (Figures 1 and 3) which is fixed at one end to the latch ring 31 and at the opposite end to the upper end of the crank 140, urges the bell crank 140 in a clockwise direction to thus move the control rod 137 along with the gap closing plates 120, 121 from right to left in Figure 9 or to the position shown in Figure 8 and open the throats 44, 100 upon the thrust bar 143 moving off of one of the segmental cams and into engagement with the outer periphery of the pattern drum 40.

Figure 5:
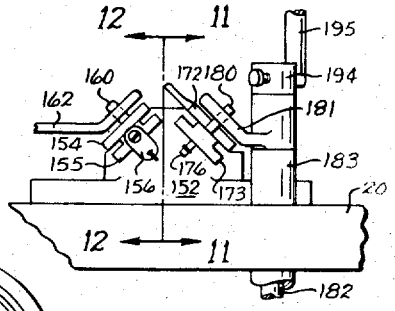
Figure 5 is an enlarged elevation looking substantially along the line 5—5 in Figure 4.
Figure 11:
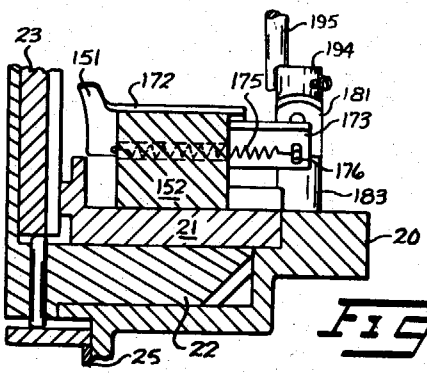
Figure 11 is an enlarged vertical sectional view through the auxiliary stitch cam block and being taken substantially along the line 11—11 in Figure 5.

An auxiliary stitch drawing station is provide beneath the auxiliary throat 100 and comprises an auxiliary needle raising cam 150 and an auxiliary needle lowering or stitch drawing cam 151 (Figures 5, 11 and 12). The auxiliary needle raising cam 150 has a stem 154 thereon which extends rearwardly and is in sliding engagement with one beveled edge of the cam block 152. The stem 154 is fixed on a T-shaped guide block 155 which slides in a groove cut in the cam block 152 and has a spring perch 156 secured to its outer free end.

The needle raising cam 150 as well as the guide block 155 are urged inwardly into engagement with the needle cylinder 23 by a tension spring 157 (Figure 12), the inner end of which is fixedly secured to the block 152 and penetrates a bore in the block 152 while its outer end is connected to the spring perch 156.

The stem 154 of the auxiliary needle raising cam 150 has an outwardly extending abutment 160 secured therein which penetrates a slot in one leg of a bell crank 162 (Figures 4 and 5) pivotally connected as at 163 on the cam plate 21. The opposite leg of the bell crank 162 has one end of a control rod 164 oscillatably mounted therein, and the other end of the control rod 164 is oscillatably mounted on the upper end of a bell crank 165 (Figures 1 and 4), the upper end of which is guided in the plate 115. The bell crank 165 is oscillatably mounted on a support shaft 166 and the lower or reading end thereof is adapted to at times engage the outer periphery of the main pattern drum 40 and at other times to engage one of two segmental cams 167 and 167a fixed on the pattern drum 40.

The bell crank 165 is urged into engagement with the segmental cams 167, 167a or the outer periphery of the main pattern drum 40 by a tension spring 170 (Figure 1), one end of which is secured to the bell crank 165 and the opposite end of which is secured to the bed plate 20. When the reading end of the bell crank 165 is in engagement with one of the segmental cams 167, 167a, the bell crank 162 will be moved in a clockwise direction in Figure 4 to thus move the needle raising cam 150 radially away from the needle cylinder 23 to substantially the position shown in Figures 4 and 12. Thus, any needles N passing thereby will not be raised by the needle raising cam 150.

Upon the reading end of the bell crank 165 moving into engagement with the outer periphery of the main pattern drum 40, the bell crank 165 will be moved in a clockwise direction to thus allow the spring 157 in the auxiliary stitch cam block 152 to move the bell crank 162 in a counterclockwise direction and move the auxiliary needle raising cam 150 radially towards the needle cylinder 23. Thus, any needles N passing by the needle raising cam 150 will be raised thereby to a position high enough so that the hooks thereof will pick up any yarn fed by the fingers 102, 102a. *It should be noted that the yarn feed fingers 42, 120 and 102a form serially arranged yarn feeding stations, and the cams 70—73 and 150, 151 form serially arranged knitting stations.*

The needle lowering or auxiliary stitch cam 151 is provided with a stem 172 (Figures 4 and 11) which is secured to a T-shaped guide block 173 slidably mounted in a suitable groove in the auxiliary stitch cam block 152. The auxiliary stitch cam 151 is normally urged into engagement with the needle cylinder 23 by a tension spring 175 (Figure 11), the inner end of which is secured on the auxiliary cam block 152. The spring 175 passes through a bore in the block 152 and the outer end of the spring 175 is secured on a spring perch 176 fixed on the T-shaped guide bar 173.

The T-shaped guide bar 173 is also provided with an outwardly extending abutment 180 (Figure 5) which engages a slot in a control arm 181, the inner end of which is fixed on a vertically extending control rod 182 oscillatably mounted in the bed plate 20. The arm 181 is spaced above the bed plate 20 by a spacing collar 183 and the control rod 182 extends below the bed plate 20 (Figures 1 and 2) and has one end of a lever arm 185 (Figures 1 and 2) fixed thereon to the inner end of which is oscillatably connected one end of an adjustable control rod 186.

The control rod 186 extends rearwardly and is oscillatably mounted on one leg of a downwardly extending bell crank 187 (Figure 2) pivotally mounted on the support shaft 166. The reading end of the bell crank 187 is adapted to at times engage segmental cams 191 and 191a (Figure 1) and at other times to engage the outer periphery of the main pattern drum 40.

When the bell crank 187 is in engagement with either of the segmental cams 191, 191a, the lever arm 181 (Figure 4) is moved in a counterclockwise direction to thus move the T-shaped guide bar 173 and the needle lowering or stitch cam 151 radially away from the needle cylinder 23 so that any needles N which pass the needle lowering or stitch cam 151 will not be lowered by the cam 151.

Upon the reading end of the bell crank 187 moving into engagement with the outer periphery of the main pattern drum 40, the bell crank 187 is moved in a clockwise direction in Figure 1 to thus move the crank arm 181 in a clockwise direction in Figure 4 so that the spring 187 may move the T-shaped guide bar 173 as well as the needle lowering cam 151 into engagement with the needle cylinder 23 to thus lower any needle N passing the auxiliary stitch cam 151.

The post 182 has a collar 194 (Figures 1 and 5) fixed thereto to which the lower end of an upstanding control rod 195 is secured, the upper end of the control rod 195 engaging a slot or cutout portion 196 in a plate 197 (Figure 6). A sinker retracting cam 200 is secured to the inner end of the plate 197 which plate is slidably mounted in the sinker cap 30 and is held in position by a plate member 202 (Figures 6 and 7). The sinker cap 30 is also cut horizontally and a sinker returning cam 203 is secured in the concentric cavity 93 to return the sinkers 91 to their innermost position after being moved outwardly radially of the needle cylinder by the sinker retracting cam 200.

Since the control rod 195 is fixed on the shaft 182 and the lever arm 181 is also fixed on the shaft 182, it is thus seen that as the lever arm 181 is moved in a counterclockwise direction in Figure 4 the control rod 195 will also be moved in a counterclockwise direction to thus move the plate 197 and the sinker retracting cam 200 inwardly toward the needle cylinder 23 as the stitch cam 151 is moved outwardly away from the needle cylinder.

Conversely, as the lever arm 181 is moved in a clockwise direction in Figure 4, the control rod 195 will also be moved in a clockwise direction (Figure 4) to thus cause the control rod 195 (Figure 6) to engage the outer edge of the slot 196 and move the plate 197 and the sinker cam 200 outwardly radially of the needle cylinder to substantially the position shown in Figure 6 as the cam 151 is moved towards the needle cylinder 23. In this manner all of the sinkers passing the cam 200 will be moved outwardly radially of the needle cylinder 23 so the yarn being fed by either of the yarn feeding fingers 102, 102a may be fed beneath the nibs of the sinkers 91 to thus hold the fabric below the nibs of the sinkers. It is important that the sinkers 91 be withdrawn at the auxiliary feeding station so that the yarn fed thereto will be held underneath the nibs of sinkers as the needles forming stitches are again raised by the auxiliary hardened cam 66 heretofore described.

It is thus seen that any time the needle lowering or auxiliary stitch cam 151 is in operative position so that the needles travel the path indicated at P–10 in Figure 8, the sinker retracting cam 200 will be in the position shown in Figure 6 and the yarn feeding finger 102 will be in the position shown in Figure 8 so that stitches will be drawn as the needles N pick up the yarn AL. After the needles N are lowered along the path P–10 by the auxiliary stitching cam 151 they will subsequently be raised by the auxiliary hardened cam 66 in Figure 8. The left-hand stitch cam 72 lowers the needles N along a path P–11 (Figure 8) to form stitches with the yarn ML so that two courses are formed with each revolution of the needle cylinder 23.

It will be appreciated that the arrangement of the varying lengths of needle butts in the needle cylinder 23 is important in inserting and removing the auxiliary stitch cams 150, 151. This is also a novel feature of this invention since it provides a means of removing the auxiliary yarn in action which insures that there are no holes or cat-eyes in the fabric at the juncture where the auxiliary yarn starts to feed to make an additional course in the fabric.

As shown in Figure 13, the needle cylinder is preferably divided into six sections; sections A, B, C, D, E, and F, and, in a five hundred needle knitting machine, for example, there would be substantially two hundred fifty long butt needles indicated at LN in section A. Section B preferably comprises sixty medium butt needles indicated at MN, section C preferably comprises twenty short butt needles indicated at SN, section D preferably comprises twenty medium butt needles indicated at MN, section E preferably comprises twenty short butt needles indicated at SN and section F preferably comprises 130 medium butt needles indicated at MN. The sections B, C, D, E and F preferably comprise approximately half the distance around the needle cylinder and are the needles on which the heel and toe pockets of the hose are knit.

The stocking or hose H shown in Figure 14 includes a double thickness turned welt 210 and a single thickness shadow welt 211, a leg portion 212, a heel pocket 213, a foot portion 214 and a toe pocket 215. The enlarged fragmentary view of the fabric shown in Figure 15 which is taken at the start of the foot portion 214 illustrates in the seven courses C–1 through C–6 and in the wales illustrated at W–1 through W–48 how the two yarns are introduced after knitting a single feed knit heel pocket with a relatively heavy denier yarn to a knit two-feed foot portion with a finer denier yarn. Figure 15 also illustrates how the yarn is introduced to add an additional course without forming a hole or cat-eye in the fabric. In Figure 15 the wales W–7 to W–43 are omitted since they would be identical to the wales W–44 and W–45.

In operation, the machine starts to knit a hose on bare needles using one of the main yarn feed fingers 42 and feeding the yarn MH at only the throat 44 with stitches being drawn or formed at the left-hand stitch cam 72 with the auxiliary stitch cams 150, 151 as well as the auxiliary yarn feeding fingers 102, 102a being in withdrawn position. This make-up consists of four to eight courses with one of the main yarn feed fingers 42 in operation and with the leading course of the fabric being held on the dial needles and hooks so that the fabric may be knit for any desired length. The top edge of the fabric is held on the dial needles and is subsequently transferred onto the cylinder needles to form a double thickness welt such as illustrated at 210 in a conventional manner.

The auxiliary yarn feed finger 102a with the heavy denier yarn AH is moved into operative position after the first four to eight courses and the auxiliary stitch cams 150, 151, as well as the sinker retraction cam 200 are moved into position to start feeding the auxiliary yarn AH to thus knit two courses with each revolution of the needle cylinder in a manner to be more fully described. The welt 210 is thus knit with two-feed knitting as well as the shadow welt 211.

After knitting the shadow welt 211, the yarn feeding fingers 42 change in the main throat 44 so that a lighter or finer denier yarn ML is fed to the main throat plate 45. Also, the yarn feed finger 102 moves into *operative position* [engagement] to feed a lighter denier yarn AL to make the leg 212 of the hose H with a two-feed operation. The auxiliary yarn feed finger 102 is then moved out of operation and the heel pocket 213 is made by single feed with the knitting machine operating with the yarn MH being supplied from the main throat 44 only in a reciprocatory manner. During reciprocatory knitting the gap closing plates 120, 121 are moved into operating or closed position as shown in Figure 9.

As the heel pocket 213 is being completed (Figure 15), the course C–1 is made from left to right with a heavy denier yarn MH being fed by one of the yarn feeding fingers 42, the auxiliary yarn feeding fingers 102, 102a and the auxiliary stitch cams 150, 151 being out of operation. The next course C–2 is made with the needle cylinder traveling in the opposite direction or with the fabric being formed from right to left in Figure 15. The next succeeding course C–3 is made from left to right in Figure 15 and it is during this course that yarn feeding fingers 42 change to remove the yarn MH and the lighter denier yarn ML is inserted for knitting alternate courses in the foot 214.

The light denier yarn ML is introduced with one of the main yarn feeding fingers 42 at the course C–3 and the needle wale W–3 (Figure 15). Thus two yarns ML and MH are fed to each of the needles in the wales W–3 through W–46 at course C–3 to form stitches with both yarns to tie the leading end of the light yarn ML, from one of the main yarn feeding fingers 42, into the fabric before the heavy yarn MH is removed from the fabric at course C–3 and wale W–46. The next course C–4 and the succeeding courses are made with the machine moving in a continuous circular manner and forming the fabric from right to left in Figure 15 and it is in this course C–4 that the auxiliary yarn AL is added to start an additional course C–4a. Course C–4 is the first circular course after making the heel pocket and this description will apply to the manner in which the yarn is introduced each time, since each time the auxiliary yarn is introduced, it is done in an identical manner.

During the first counterclockwise revolution of the needle cylinder 23 in making the first rotary course of the foot 214, the auxiliary yarn feeding finger 102 feeding the yarn AL is lowered as section B of the needle cylinder passes thereby and the needle raising cam 150 is moved into engagement with the short butt needles in section C to raise the needles in section D and the remainder of the needles in sections E and F to take the auxiliary yarn AL in the hooks thereof. The needle lowering or auxiliary *stitch* [switch] cam 151 is moved into engagement with the short butt needles in section E as they pass thereby to thus pull down the medium butt needles in section F along the path P–10, and allow the needles in *sections* [section] D and E to *initially* pass the stitch cam 151 without being lowered to thus lay the yarn in the hooks of these forty needles in sections D and E but not to form stitches with the same during this revolution but to start forming *a new course of* stitches *C–4a* with the needles in section F as they are lowered to pull the yarn through the loops previously formed *at the main left-hand stitch cam 72* in course *C–4* [C–3]. The *course C–4a continues to course C–5 and the* forty needles in which the yarn *AL* was laid in the hooks thereof in sections D and E but which was not knitted at the auxiliary yarn station then is knit with the yarn ML picked up from the main yarn feeding fingers 42 to form approximately forty wales in course *C–5* [C–4] from both the main yarn ML and the auxiliary yarn AL from the wale W–6 to the wale W–46. *It should be noted that the* [A] new course C–4a *started* [is begun] at wale W–5 in Figure 15 with the yarn AL only and [starting] on the first medium butt needle MN in section F.

It is thus seen that the end of the yarn AL when introduced from the auxiliary yarn feeding finger is firmly anchored in the forty stitches *in course C–5 formed after course C–4a, but which forty needles actually precede* [preceding] the new course C–4a and *prevent* [prevents] a hole, open place or cat-eye from being formed between the wales W–5, W–6 in course C–4 and subsequent courses, as would have been formed had not this end been tied into the *adjacent* [previously] knit course. Thus, alternate courses in the two-feed knitting are supplied yarn from the main throat 44 and the auxiliary throat 100. This method of knitting the loose end of the yarn AL into the next succeeding course *after laying said loose end in the hooks of needles* also prevents the end of the yarn AL from being unraveled after it is trimmed in the finishing operation.

After the foot 214 has been knit, the yarn AL may be removed from the two-feed knitting operation to permit knitting of the toe pocket 215 in a reciprocatory manner in a single feeding knitting operation. The needle raising cam 150 is removed during the last circular course while section D is passing the auxiliary throat 100 and the needle lowering cam 151 is removed as the last needle raised by the cam 150 is lowered and the yarn feed finger 102 is raised. The gap closing plates 120, 121 are moved into position across the throats 44, 100 and the toe pocket is knit in a conventional manner by switching the long butt needles in section A up to take the yarn MH from the throat 44 and the machine starts to reciprocate to knit the toe, first with narrowing and then widening to complete the sock or hose.

It is thus seen that there has been provided a method and apparatus for knitting two feeds simultaneously during circular knitting which includes at least two improved gap closers as well as at least two separate knitting stations, one of which is separate and apart from the main conventional knitting station as well as a novel method of introducing auxiliary yarn to the fabric which insures that no loose ends may pull out and no holes or cat-eyes will appear in the fabric knit in this manner with two feeds. Since alternate courses are knit with yarn from different yarn feeding fingers it is seen that this improved method of knitting is easily adaptable to knitting the new "stretch" yarns which are twisted in opposite directions.

In the drawings and specification there has been set forth a preferred embodiment of the invention and, although specific terms are employed, they are used in a generic and descriptive sense only and not for purposes of limitation, the scope of the invention being defined in the claims.

We claim:

[1. In a method of knitting seamless hosiery having a first portion knit from at least one first yarn and a second portion knit from at least one second yarn and at least one third yarn, the steps of knitting a plurality of courses solely from the first yarn during reciprocatory knitting to form said first portion, knitting a few stitches from the first and second yarns in a medial portion of the final course in the first portion, then continuing knitting solely from the second yarn to complete said final course, then commencing rotary knitting solely from the second yarn for a substantial part of another course, knitting a few stitches each from the second and third yarns and then knitting successive circular courses solely from the third yarn and soley from the second yarn in alternation.]

[2. A method of knitting on a circular knitting machine which includes the steps of feeding a plurality of first yarns separately to the needles during rotary knitting of a first fabric section so that any one yarn appears only in recurring courses, feeding a second yarn to needles during reciprocatory knitting of a second fabric section while progressively idling the needles by at least one needle for each rotary movement of the needle cylinder for a plurality of movements and progressively returning the needles into action by at least one needle for each rotary movement of the needle cylinder for a plurality of movements, feeding any one of said first yarns and also feeding the second yarn to a few needles while knitting a final course in the second fabric section and then feeding said first yarns separately to the needles during rotary knitting of a third fabric section so that any one of said first yarns appears only in recurring courses.]

[3. A method of knitting on a circular knitting machine of a type having first and second serially arranged knitting stations which includes the step of feeding a first yarn to all of the needles and drawing stitches therewith at the first knitting station, feeding a second yarn to all of the needles and drawing stitches therewith at the second knitting station during rotary knitting of a first fabric section, then feeding only a third yarn to needles and drawing stitches therewith at the first knitting station during reciprocatory knitting of a second fabric section, then feeding the first and third yarns to a few needles and drawing a few stitches therewith at the first knitting station during the knitting of the final course in the second fabric section, then feeding only the first yarn to needles and drawing stitches therewith at the first knitting station to complete the latter course, resuming rotary knitting while feeding the first yarn and drawing stitches therewith at the first knitting station for at least a portion of a course immediately succeeding the final course in the second fabric section, feeding the first and second yarns to a few needles and drawing stitches therewith at the first knitting station only, then feeding the first yarn to all the needles and forming stitches therewith at the first station, and feeding the second yarn to all the needles and forming stitches therewith at the second knitting station with a plurality of successive revolutions of the needle cylinder during rotary knitting to form a third fabric section.]

[4. A method of knitting on a circular knitting machine of a type having first and second serially arranged yarn feeding stations and respective first and second serially arranged knitting stations which includes the steps of feeding a first yarn to all of the needles at the first feeding station and drawing stitches therewith at the first knitting station, feeding a second yarn to all of the needles at the second feeding station and drawing stitches therewith at the second knitting station during rotary knitting of a first fabric section, then knitting solely from a third yarn by feeding only the third yarn to needles at the first feeding station and drawing stitches therewith at the first knitting station during reciprocatory knitting of a second fabric section, then feeding the first and third yarn to a few needles at the first feeding station and drawing a few stitches therewith at the first knitting station during the knitting of the final course in the second fabric section, then feeding only the first yarn at the first feeding station and drawing stitches therewith at the first knitting station to complete the latter course, resuming rotary knitting while feeding the first yarn at the first feeding station and drawing stitches at the first knitting station for at least a portion of a course immediately succeeding the final course in the second fabric section, feeding the first yarn at the first yarn feeding station and the second yarn at the second yarn feeding station to a few of the needles and drawing stitches therewith at the first knitting station only, then feeding the first yarn at the first feeding station and forming stitches therewith at the first knitting station and feeding the second yarn at the second feeding station and forming stitches therewith at the second knitting station in knitting successive courses with a plurality of successive revolutions of the needle cylinder during rotary knitting to form a third fabric section.]

5. In a circular knitting machine having a cylinder with needles and means for effecting rotary and reciprocatory movement to said cylinder in alternation; the combination of a main station with first and second yarn feeds and first and second main stitch cams, an auxiliary yarn feed and an auxiliary stitch cam at a station spaced circumferentially of the cylinder from the main station, means to move the second yarn feed into operative position, means to raise needles for taking the second yarn for drawing stitches at the first and second main stitch cams in alternation during reciprocatory movements of the cylinder, means to move the first yarn feed into operative position while knitting a final course during reciprocatory knitting to cause needles to take both the first and second yarns for drawing stitches at one of said main stitch cams, means to then withdraw the second yarn feed to cause needles to take only the first yarn to draw stitches therewith at said one of said main stitch cams to complete said final course, said first yarn being taken by all the needles and stitches drawn therewith at the other main stitch cam during the next succeeding rotary movement of said cylinder, means for moving the auxiliary yarn feed into operative position, means to raise all the needles to take the auxiliary yarn during said last-mentioned rotary movement, means to move said auxiliary stitch cam into operative position upon a few of said needles having taken said auxiliary yarn whereby stitches are drawn with the remaining needles as they pass the auxiliary stitch cam and whereby said few of the needles draw stitches with both the first and auxiliary yarns and said remaining needles draw stitches with the first yarn only at said other main stitch cam during the next succeeding revolution of the cylinder, and whereby all needles take and knit said first and auxiliary yarns in alternation to knit a plurality of successive courses in rotary knitting in which the first and auxiliary yarns appear in respective alternate and intervening courses.

6. A structure according to claim 5 wherein said machine has a circular series of sinkers co-operating with said needles, an auxiliary sinker withdrawing cam disposed adjacent said auxiliary yarn feed, and means operable automatically to move said auxiliary sinker cam into operative position for withdrawing the sinkers whenever the auxiliary stitch cam is operative and to move the sinker cam to inoperative position whenever the auxiliary stitch cam is inoperative.

7. A structure according to claim 5, wherein said auxiliary stitch cam is in the form of a radially movable needle lowering cam, a needle raising cam arranged to move successive needles upwardly after they have passed the first knitting station and in advance of the lowering cam to take yarn in the hooks of the latter needles so the lowering cam then moves successive needles downwardly to draw stitches therewith with movement of the needles in one direction, and cam means disposed subsequent to the needle lowering cam for deflecting successive needles upwardly sufficiently to move the latches thereof upwardly through the stitches thus formed.

8. A structure according to claim 7 including means to move the needle raising cam into and out of operative position, and means to move the latter needle lowering cam from inoperative to operative position a predetermined period after each time the needle raising cam is moved into operative position.

*9. A method of knitting on a circular knitting machine of a type having a cylinder with needles and first and second serially arranged knitting stations which includes the steps of feeding a first yarn to all of the needles and drawing stitches therewith at the first knitting station during knitting of a first fabric section, then feeding the first yarn and a second yarn to a few needles and drawing a few stitches therewith at the first knitting station during the knitting of the final course in the first fabric section, then feeding only the second yarn to needles and drawing stitches therewith at the first knitting station to complete the latter course, feeding a third yarn to a few needles without drawing stitches therewith, then feeding the third yarn to all remaining needles and forming stitches therewith at the second knitting station, then feeding the second yarn to all the needles, including said few needles, and drawing stitches therewith at the first knitting station whereby stitches are formed of both second and third yarns together by said few needles, and then feeding and knitting the second and third yarns in alternation at the respective first and second knitting stations.*

*10. A method of knitting on a circular knitting machine of a type having a cylinder with needles and first and second serially arranged knitting stations which includes the steps of feeding a first yarn to all of the needles and drawing stitches therewith at the first knitting station and feeding a second yarn to all of the needles and drawing stitches therewith at the second knitting station during rotary knitting of a first fabric section, then feeding only a third yarn to needles and drawing stitches therewith at the first knitting station during reciprocatory knitting of a second fabric section, then feeding the first and third yarns to a few needles and drawing a few stitches therewith at the first knitting station during the knitting of the final course in the second fabric section, then feeding only the first yarn to needles and drawing stitches therewith at the first knitting station to complete the latter course, resuming rotary knitting while feeding the first yarn and drawing stitches therewith at the first knitting station for at least a portion of a course immediately succeeding the final course in the second fabric section, feeding the second yarn to a few needles without drawing stitches therewith, then feeding the second yarn to all remaining needles and forming stitches therewith at the second knitting station, feeding the first yarn to all the needles, including said few needles, and drawing stitches therewith at the first knitting station whereby stitches are formed of both first and second yarns together by said few needles, and then feeding and knitting the first and second yarns in alternation at the respective first and second knitting stations.*

References Cited in the file of this patent or the original patent

UNITED STATES PATENTS

| | | |
|---|---|---|
| 1,317,897 | Scott | Oct. 7, 1917 |
| 2,048,432 | Deans et al. | July 21, 1936 |
| 2,473,975 | St. Pierre | June 21, 1949 |
| 2,525,704 | Miller | Oct. 10, 1950 |

FOREIGN PATENTS

| | | |
|---|---|---|
| 107,712 | Australia | June 14, 1939 |